United States Patent [19]

Maeno et al.

[11] Patent Number: 4,837,493

[45] Date of Patent: Jun. 6, 1989

[54] SYSTEM FOR DRIVING DRUM

[75] Inventors: Satoru Maeno; Norio Fukuyama; Tetsuo Ohishi; Senzo Kyutoku; Thutomu Nakamura, all of Ise, Japan

[73] Assignee: Shinko Electric Co., Ltd., Japan

[21] Appl. No.: 940,625

[22] Filed: Dec. 11, 1986

[30] Foreign Application Priority Data

| | | | |
|---|---|---|---|
| Dec. 18, 1985 | [JP] | Japan | 60-285125 |
| Dec. 18, 1985 | [JP] | Japan | 60-285126 |
| Dec. 19, 1985 | [JP] | Japan | 60-286574 |

[51] Int. Cl.[4] ........ G05B 19/40

[52] U.S. Cl. ........ 318/685; 318/696; 318/721; 318/608; 310/67 R

[58] Field of Search ........ 318/685, 696, 608, 721–724, 318/661; 310/67 R, 49 R

[56] References Cited

U.S. PATENT DOCUMENTS

| | | | |
|---|---|---|---|
| 3,509,390 | 4/1970 | Loughlin et al. | 310/67 R |
| 4,121,127 | 10/1978 | Adelski et al. | 310/67 R |
| 4,488,076 | 12/1984 | MaCleod | 310/171 |
| 4,546,299 | 10/1985 | Veale | 318/602 |

OTHER PUBLICATIONS

Snowdon and Madren "Characteristics of a Synchronous Inductor Motor", Trans. AIEE, vol. 81, Part II, Mar. 1962, pp. 1–5.

*Primary Examiner*—William M. Shoop, Jr.
*Assistant Examiner*—Saul M. Bergmann
*Attorney, Agent, or Firm*—Darby & Darby

[57] ABSTRACT

A system for driving a drum includes a pulse motor including an annular rotor fixedly mounted within the drum for rotation therewith and rotatable relative to a stator disposed within the rotor. The pitches of the rotor teeth and stator teeth are determined in such a manner that a magnetic flux linking each of the coils is changed in a sinusoidal fashion in synchronism with the rotation of the rotor. A pole position-detecting device produces a multi-phase sinusoidal pole position-detecting signal representative of the position of the magnetic poles relative to the rotor. A speed control device produces a current amplitude command signal representative of a desired torque of the rotor. A multiplier multiplies the pole-position detecting signal by the current amplitude command signal to produce a multiplication signal. A current control device is responsive to the multiplication signal to output to the coils a drive current corresponding in amplitude to the current amplitude command signal and corresponding in phase to the pole-position detecting signal, thereby energizing the coils to rotate the rotor together with the drum relative to the stator.

6 Claims, 10 Drawing Sheets

36
68
48
34
26
56
62
32
66a
38a
58
60
16
12
40
42
40
10
30
44
46a
38b
28
70

COUNTER
RATE MULTIPLIER
SUBTRACTER
LATCH
ROM
ROM
D/A
D/A
COUNTER
OSC
Pf
$\theta$ mt
$\theta$'m
Ea = cos $\theta$m
Eb = sin $\theta$m
Sin $\theta$o · Cos $\theta$m
Cos $\theta$o · Sin $\theta$m
Sin ( $\theta$o − $\theta$m )
cos $\theta$o
sin $\theta$o
138
136
134
120
132
130
124
128
126
118
122
116
114
112

(a)
(b)
(c)
(d)
sin ( θo − θm )
COMPARATOR
H
L
θo
θmt
t
LATCH
LATCH
LATCH
LATCH

SYSTEM FOR DRIVING DRUM

BACKGROUND OF THE INVENTION

1. Field of the Invention

This invention relates a system for driving a drum, for example, of a color copying machine or a printer.

2. Prior Art

In recent years, it has been proposed to incorporate a pulse motor (stepping motor) in a drum of the type described so as to drive the drum for rotation. The pulse motor comprises an inner stator fixedly mounted on a drum shaft, and an outer rotor disposed around the inner rotor coaxially therewith and fixed relative to the drum, so that the drum is rotated together with the rotor. Since the pulse motor is accommodated within the drum, the machine can be of a compact size. The pulse motor of this type is often referred to as "outer rotor type" in the trade. This arrangement is disclosed in Japanese Patent Application Laid-Open (Kokai) No. 49-115429. Generally, a pulse motor is subjected to a considerable torque ripple, and besides since the pulse motor is used in an open loop circuitry, the pulse motor is not rotated smoothly, which affects the quality of a resultant copied image or a printed image.

FIG. 1 shows a pulse motor 10 of the outer rotor type which comprises a hollow cylindrical rotor 12 disposed coaxially around a shaft 14 and having a number of rotor teeth T0 formed on an inner peripheral surface thereof and spaced a predetermined pitch, and a stator 16 fixedly mounted on the shaft 14 and disposed coaxially within the cylindrical rotor 12. The stator 16 has eight magnetic poles 18*a* to 18*h* spaced equally circumferentially, that is, at an interval of 45°. Each of the magnetic poles 18*a* to 18*h* has a plurality of stator teeth T1 disposed in closed spaced opposed relation to the rotor teeth T0 of the rotor 12 and spaced from one another a pitch equal to the pitch of the rotor teeth T0 of the rotor 12. With this construction, when the stator teeth T1 are out of phase with the rotor teeth T0, as shown in FIG. 1, the stator teeth T1 of the magnetic poles 18*b*, 18*c*, 18*d* and 18*e* are 45°, 90°, 135° and 180° out of phase with the rotor teeth T0 of the rotor 12. Similarly, the stator teeth T1 of the magnetic poles 18*f*, 18*g* and 18*h* are 225°, 270° and 315° out of phase with the rotor teeth T0 of the rotor 12.

Exciting coils 20*a* to 20*h* are wound around the magnetic poles 18*a* to 18*h* of the stator 16, respectively. The coils 20*a* and 20*e* are serially connected together via a switch SW1, the coils 20*b* and 20*f* are serially connected together via a switch SW2, the coils 20*c* and 20*g* are connected together via a switch SW3, and coils 20*d* and 20*h* are serially connected together via a switch SW4. With this construction, when the switches SW1 to SW4 are sequentially closed, so that the mating coils 20*a* and 20*e*, the mating coils 20*b* and 20*f*, the mating coils 20*c* and 20*g* and the mating coils 20*d* and 20*h* are sequentially excited one after another, thereby rotating the rotor 12 in a clockwise direction in a step-like manner.

The position of the rotor teeth T0 of the rotor 12 is detected by either an optical sensor or a magnetic sensor, and in accordance with the results of this detection, the pulse motor 10 is supplied with current so as to serve as a servo motor. In this case, it is important that the cogging and the torque ripple are kept to a low level. To achieve this, it is necessary that the magnetic reluctance between the stator teeth T1 and the rotor teeth T0 varies sinusoidally. In other words, it is necessary that the voltage induced in each coil is sinusoidally varied in accordance with the rotation of the rotor 12 to reduce a distortion of the induced voltage. Conventionally, in order to achieve the above-mentioned sinusoidal variation of the magnetic reluctance or the induced voltage, grooves either of the rotor 12 or the stator 16 have the teeth separate from one another and are arranged obliquely relative to the axis of the shaft 14. Since each of the rotor 12 and the stator 16 is constructed of laminated sheets, it is rather cumbersome to provide such a skewed slot arrangement in the manufacture of the rotor or the stator. This problem is serious particularly where the pulse motor 10 is of the hybrid type including a rotor having a permanent magnet contained in the laminated core sheets.

In a drum drive system under consideration, generally, a detector called "resolver" is used for detecting the position of the magnetic poles of the pulse motor relative to the rotor of the pulse motor, that is to say, the position of rotation of the rotor, in order to energize the pulse motor at a proper timing. The conventional resolver comprises a rotor and a stator which are configured and arranged as described above for the conventional pulse motor, so as to cause the magnetic reluctance between the stator teeth T1 and the rotor teeth T0 to vary sinusoidally. Therefore, because of a skewed slot arrangement, the manufacture of such a conventional resolver is also cumbersome. Further, in such a magnetic pole position-detecting method, a two-phase sinusoidal exciting signal composed of sine and cosine waves is supplied to the stator coils of the resolver. In this case, it is known that the following formula is obtained:

$$X = A \sin (2\pi ft + \theta)$$

wherein $\theta$ is an angle of rotation of the rotor, f is a frequency of the exciting signal, and X is an output of the stator coils. Therefore, $X = A \sin \theta$ is obtained by sampling the output X every $2\pi ft = 2\pi$, $X = A \cos \theta$ is obtained by sampling the output X every $2\pi ft = (2\pi + /2)$, thereby detecting an angle of rotation of the rotor. However, there inevitably develops an error in amplitude and phase of the two-phase sinusoidal exciting current, and therefore the detection is not carried out accurately.

SUMMARY OF THE INVENTION

It is therefore an object of this invention to provide a drum drive system in which a pulse motor can be rotated smoothly like a DC motor.

According to the present invention, there is provided a system for driving a drum, the drum being rotatable about an axis thereof, said system comprising:

(a) a pulse motor comprising an annular rotor adapted to be fixedly mounted within the drum coaxially therewith for rotation with the drum and having a series of rotor teeth formed at equal intervals over an entire inner periphery thereof, and a stator disposed within said rotor coaxially therewith and having a plurality of magnetic poles having respective exciting coils and spaced equally circumferentially thereof, each of said magnetic poles having a series of stator teeth disposed at equal intervals in closely spaced opposed relation to said rotor teeth, the pitches of said rotor teeth and stator teeth are determined in such a manner that a magnetic flux linking each of said coils is changed in a sinusoidal fashion in synchronism with the rotation of said rotor;

(b) pole position-detecting means for producing a multi-phase sinusoidal pole position-detecting signal representative of the position of said magnetic poles of said stator relative to said rotor;

(c) speed control means for producing a current amplitude command signal representative of a desired torque of rotation of said rotor;

(d) multiplier means for multiplying said pole-position detecting signal by said current amplitude command signal to produce a multiplication signal; and (e) current control means responsive to said multiplication signal to output to said coils a drive current corresponding in amplitude to said current amplitude command signal and corresponding in phase to said pole-position detecting signal, thereby energizing said coils to rotate said rotor together with the drum relative to said stator.

DESCRIPTION ON OF THE PREFERRED EMBODIMENT OF THE INVENTION

Figure 1:
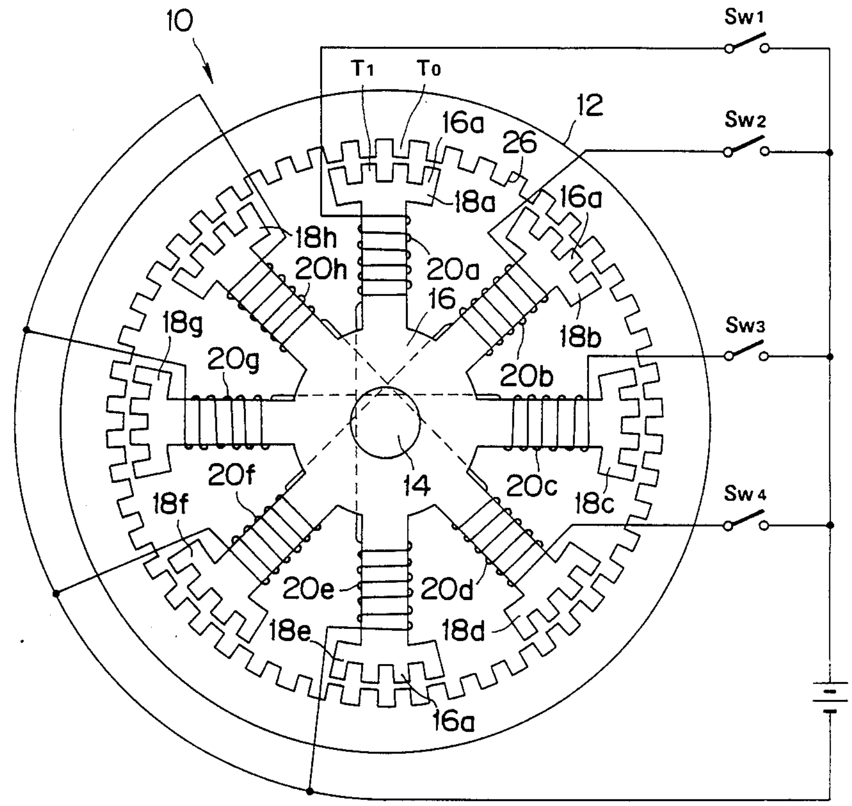
FIG. 1 is a schematic view of a conventional pulse motor.
Figure 2:
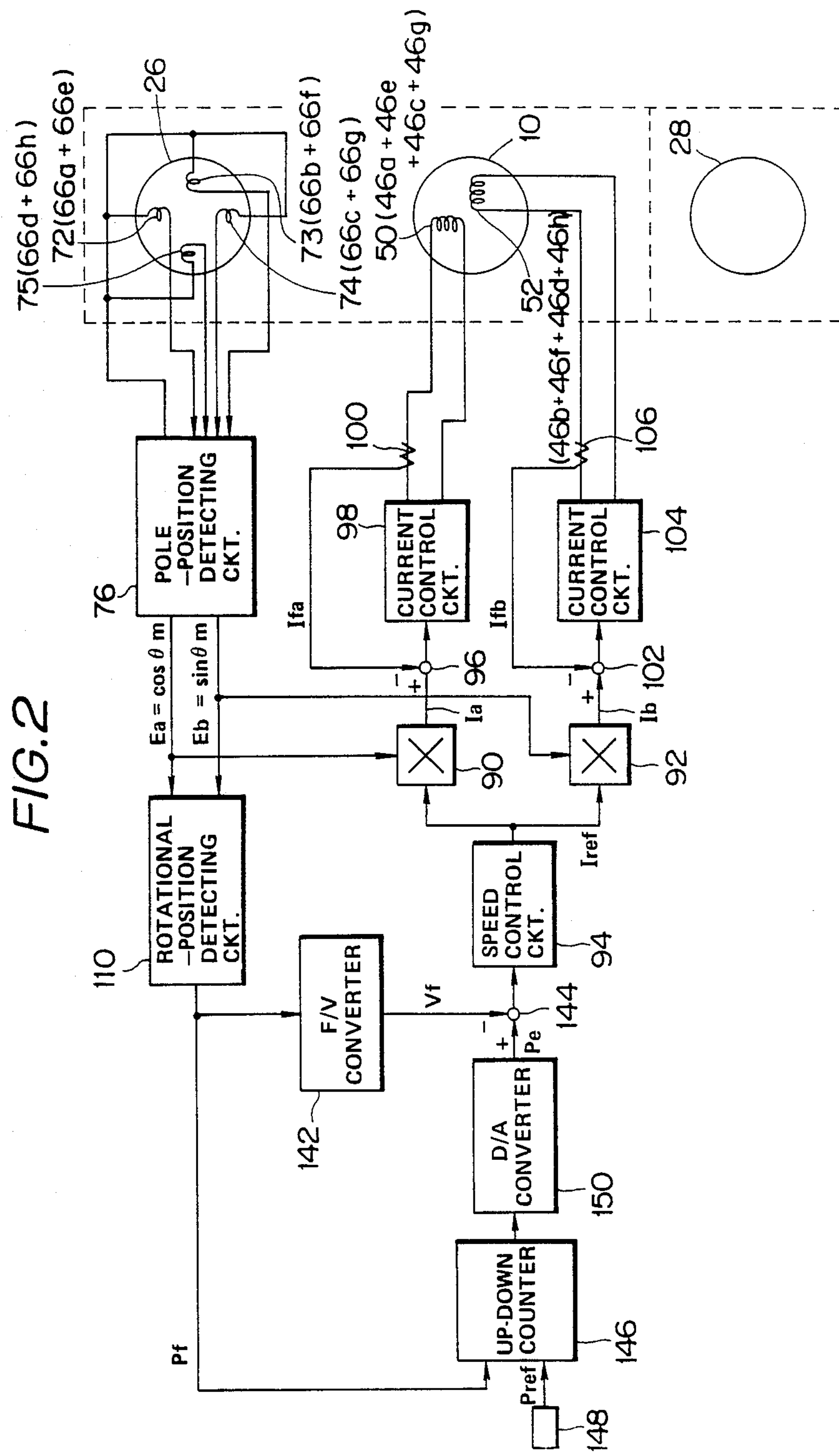
FIG. 2 is a block diagram of a drum drive system provided in accordance with the present invention.

FIG. 2 shows a block diagram of a system for driving a drum, for example, of a color copying machine, a line printer or the like.

Figure 3:
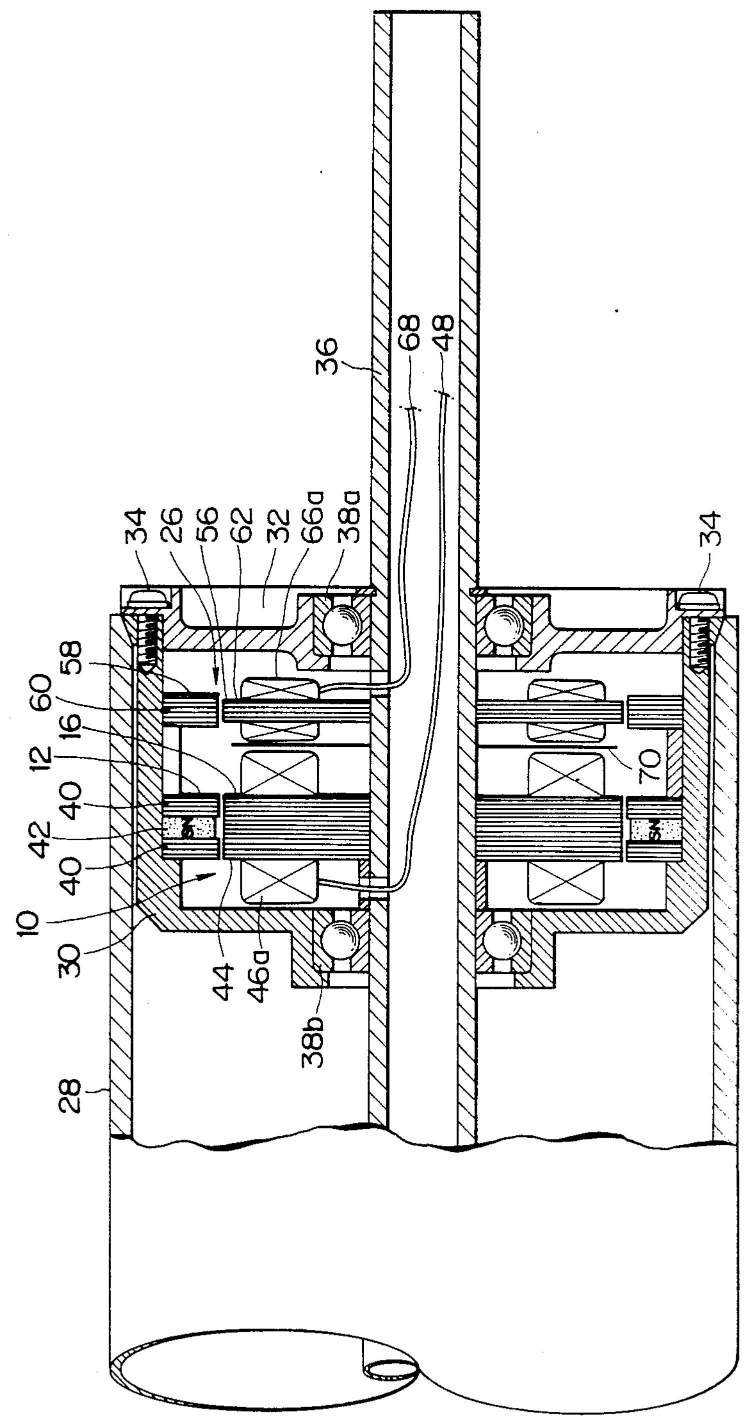
FIG. 3 is partly-broken side-elevational view of a drum, showing a pulse motor and a position sensor incorporated therein.

As shown in FIG. 3, the drum drive system comprises a pulse motor 10 of the outer rotor-type including a rotor 12 and a stator 16 having magnetic poles 18*a* to 18*h* (FIG. 4), and a position sensor 26 for detecting the position of the magnetic poles of the stator 16 relative to the rotor 12, both of the pulse motor 10 and the position sensor 26 being accommodated within a hollow cylindrical drum 28. More specifically, the pulse motor 10 comprises a cup-like or cylindrical casing 30 with a lid 32 for closing an open end of the casing 30, and the drum 28, the casing 30 and the lid 32 are joined together by bolts 34. The casing 30 and the lid 32 are mounted on a shaft 36 for rotation about an axis thereof through bearings 38*a* and 38*b*, the shaft 36 extending through the drum 28 coaxially therewith, so that the drum is also rotated together with the casing 30 and the lid 32 relative to the shaft 36. The stator 16 of the pulse motor 10 is fixedly mounted on the shaft 36 while the rotor 12 of an annular shape is disposed around the stator 16 coaxially therewith and fixed to the inner peripheral surface of the drum 28.

The rotor 12 of the pulse motor 10 is of the hybrid type and comprises a pair of annular outer cores 40 and 40 (FIG. 3) and an annular magnet 42 sandwiched between these cores. The stator 16 comprises an inner core 44 having eight radial magnetic poles 18*a* to 18*h* spaced equally circumferentially, and eight exciting coils 46*a* to 46*h* wound around the magnetic poles 18*a* to 18*h*, respectively. The coils 46*a* to 46*h* are connected to a power source via lead wires 48 for being excited as later described, the lead wires 48 passing through the hollow shaft 36.

Figure 4:
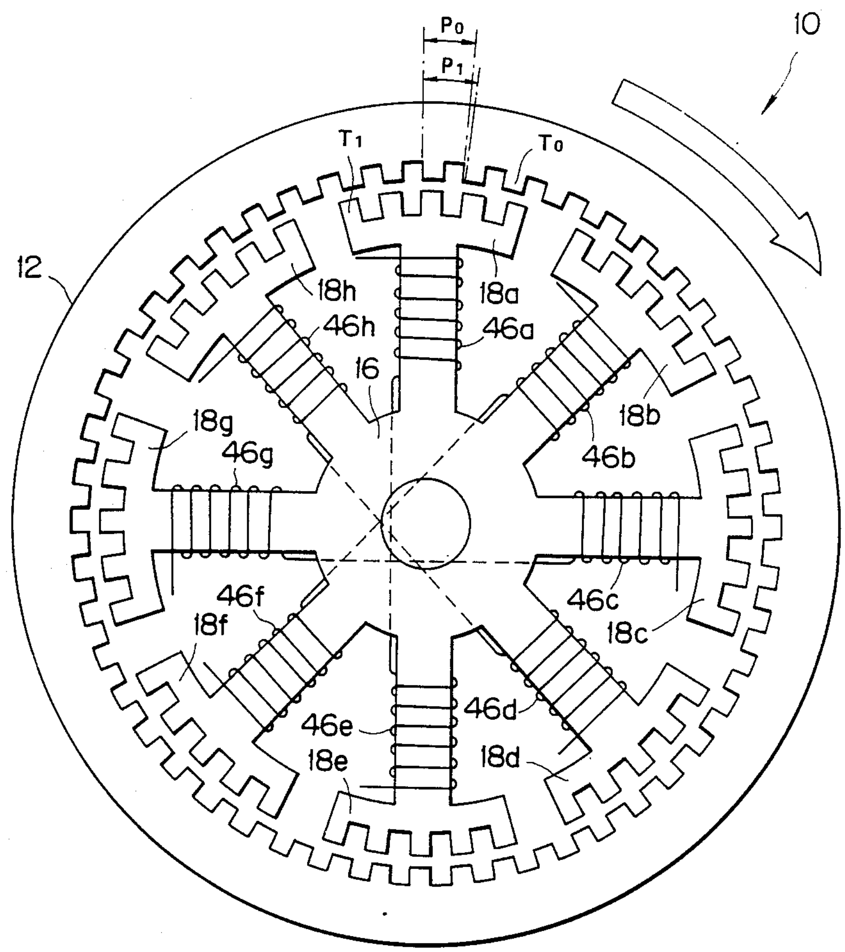
FIG. 4 is a side-elevational view of the interior of the pulse motor.
Figure 5:
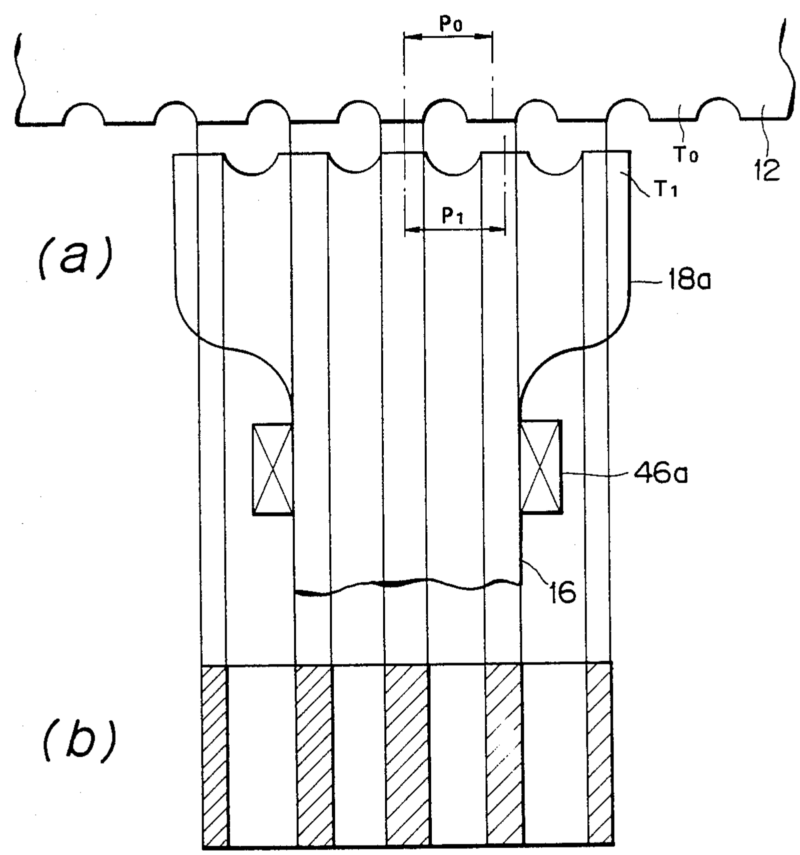
FIG. 5 is a schematic view showing the relation between the teeth on the rotor and stator of the pulse motor.

Each of the outer cores 40 and 40 of the rotor 12 has a series of teeth T0 formed over the entire inner periphery thereof and spaced from one another a pitch P0, and the teeth T0 on one core 40 and the teeth T0 on the other core 40 being in alignment with each other when viewed from one side of the rotor 12 (FIG. 4). A series of teeth T1 are formed on the outer end of each of the eight magnetic poles 18*a* to 18*h* of the stator 16, the teeth T1 being spaced from one another a pitch P1. The stator teeth T1 are disposed in closely spaced opposed relation to the rotor teeth T0. The pitch P1 of the stator teeth T1 is 1.125 (i.e., 9/8) times greater than the pitch P0 of the rotor teeth T1. With this arrangement, when the center of the magnetic pole 18*a* of the stator 16 is brought into alignment with the center of one tooth T0 of the rotor 12, as shown in FIG. 5(*a*), the five stator teeth T1 on the magnetic pole 18*a* are out of phase from the opposed rotor teeth T0 −90°, −45°, 0°, +45°, and +90°, respectively. And, the area of overlap between each pair of opposed teeth T0 and T1 decreases progressively from the center of the magnetic pole 18*a* toward the opposite ends, as shown by hatching in FIG. 5(*b*). With this arrangement, when the rotor 12 is rotated, the magnetic flux linking each of the coils 18*a* to 18*h*, varies in a sinusoidal fashion as a function of the rotation angle of the motor so that the voltage induced in the coil is varied in a sinusoidal fashion, thereby reducing the torque ripple.

When the center of the magnetic pole 18*a* of the stator 16 is brought into alignment with the center of one tooth T0 of the rotor 12, as shown in FIG. 5(*a*), the centers of the magnetic poles 18*b* to 18*d* are 90°, 180° and 270° out of phase from corresponding ones of the rotor teeth T0, respectively. And, the centers of the magnetic poles 18*e* to 18*h* disposed 180° out of phase from the magnetic poles 18*a* to 18*d*, respectively, are 90°, 180° and 270° out of phase from corresponding ones of the rotor teeth T0, respectively. In other words, the central stator teeth T1 of the diametrically opposite magnetic poles 18*a* and 18*e* are out of phase from corresponding ones of the rotor teeth T0 by the same angle. This is also true of the diametrically opposite magnetic poles 18*b* and 18*f*, the diametrically opposite magnetic poles 18*c* and 18*g* and the diametrically opposite magnetic poles 18*d* and 18*h*.

Figure 6:
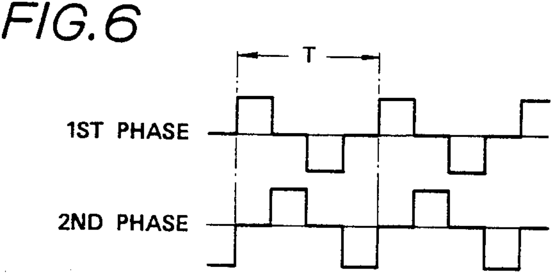
FIG. 6 is a diagrammatical view showing a waveform of a two-phase drive signal.

The coils 46*a*, 46*e*, 46*c* and 46*g* are serially connected together to form a first motor coil 50 (FIG. 2) while the coils 46*b*, 46*f*, 46*d* and 46*h* are serially connected together to form a second motor coil 52. A two-phase drive signal composed of 90°-out-of-phase two alternating currents (FIG. 6) is supplied to the motor coils 50 and 52 to operate the pulse motor 10 in a so-called bipolar fashion, so that the rotor 12 is rotated in a direction indicated by an arrow in FIG. 4. In this case, the rotor 12 is rotated or angularly moved one pitch P0 of the rotor teeth T0 per one period T of the frequency of the drive signal.

The position sensor 26 comprises an annular stator 56 fixedly mounted on the shaft 36, and an annular rotor 58 disposed around the stator 56 coaxially therewith and fixed to the inner peripheral surface of the drum 28. The sensor rotor 58 comprises an annular outer core 60, and the sensor stator 56 comprises an inner core 62 having eight radial magnetic poles 64*a* to 64*h* spaced equally circumferentially, and eight exciting coils 66*a* to 66*h* wound around the magnetic poles 64*a* to 64*h*, respectively. The coils 66*a* to 66*h* are connected to an associated circuitry via lead wires 68, the lead wires 68 passing through the hollow shaft 36. A magnetic shielding plate 70 is fixedly mounted on the shaft 36 and is disposed between the stator 16 of the pulse motor 10 and the sensor stator 56.

Figure 7:
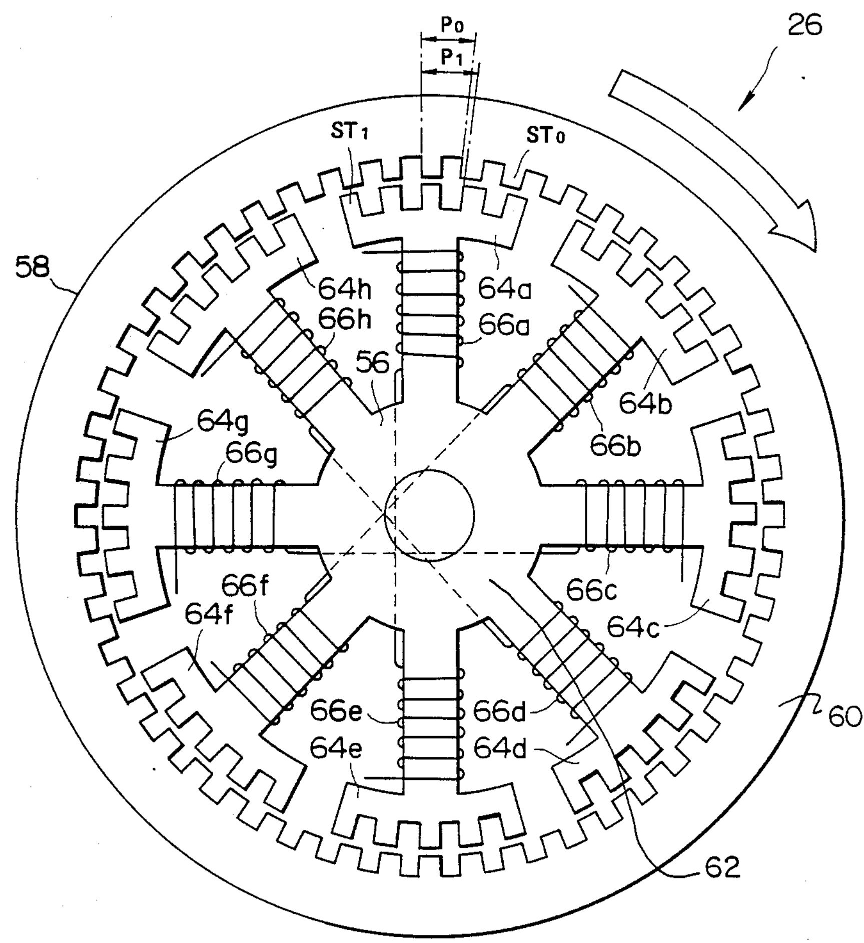
FIG. 7 is a view similar to FIG. 4 but showing the position sensor

In order that the position sensor 26 can accurately detect the position of the magnetic poles 18*a* to 18*h* of the stator 16 of the pulse motor 10 relative to the rotor 12, the teeth arrangement of the rotor and stator of the position sensor 26 is identical to that of the rotor and stator of the pulse motor 10. More specifically, as shown in FIG. 7, the outer core 60 of the position sensor 26 has a series of teeth ST0 formed over the entire inner periphery thereof and spaced from one another a pitch P0 which is equal to the pitch P0 of the rotor teeth T0 of the pulse motor 10, and a series of teeth ST1 are formed on the outer end of each of the eight magnetic poles 64*a* to 64*h* of the stator 56, the teeth ST1 being spaced from one another a pitch P1 which is equal to the pitch P1 of the stator teeth T1 of the pulse motor 10. The stator teeth ST1 are closely spaced from the rotor teeth ST. The pitch P1 of the stator teeth ST1 is 1.125 (i.e., 9/8) times greater than the pitch P0 of the rotor teeth ST1. With this arrangement, when the center of the magnetic pole 64*a* of the stator 56 is brought into alignment with the center of one tooth ST0 of the rotor 58, as described above for the pulse motor 10 with reference to FIG. 5(*a*), the five stator teeth ST1 on the magnetic pole 64*a* are out of phase from the opposed rotor teeth ST0 −90°, −45°, 0°, +45°, and +90°, respectively. And, the area of overlap between each pair of opposed teeth ST0 and ST1 decreases progressively from the center of the magnetic pole 64*a* toward the opposite ends, as described above for the pulse motor 10 with reference to FIG. 5. With this arrangement, the magnetic reluctance between the teeth ST1 of the stator 56 and the teeth ST0 of the rotor 58 varies sinusoidally when the rotor 58 is rotated. The coils 66*a* and 66*e* are serially connected together to provide an exciting coil 72 (FIG. 2), and similarly the serially connected coils 66*b* and 65*f*, the serially connected 66*c* and 66*g* and the serially connected coils 66*d* and 66*h* provide exciting coils 73, 74 and 75, respectively.

Figure 8:
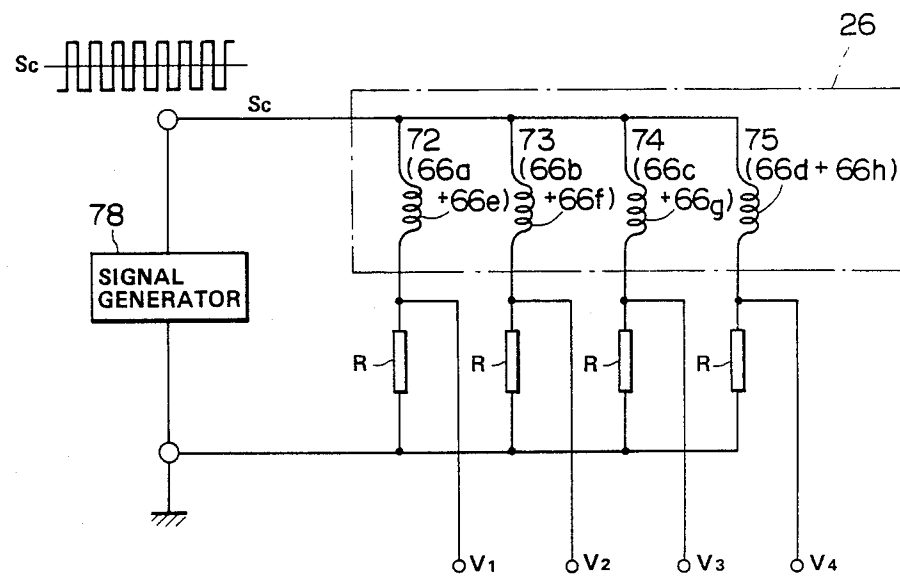
FIG. 8 is a circuit diagram of a portion of a pole-position detecting circuit.
Figure 9:
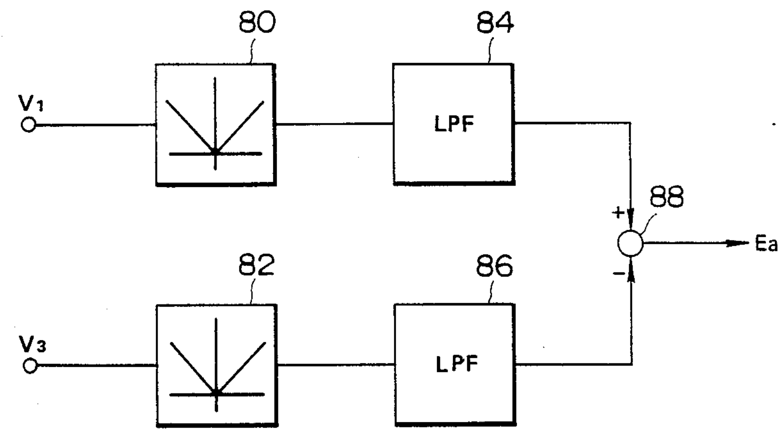
FIG. 9 is a block diagram of a portion of the pole-position detecting circuit.

A pole position-detecting circuit 76 (FIG. 2) will now be described with reference to FIGS. 8 and 9. Four shunt resistors R are serially connected to the exciting coils 72 to 75, respectively, to provide four serial circuits. One terminals of these four serial circuits are connected together, and a carrier signal Sc is supplied to these one terminals. The other terminals of the four serial circuits are grounded. The carrier signal Sc is in the form of an square wave having a frequency of 5 kHz and is outputted from a signal generator 78. Each of shunt voltages V1 to V4 is derived from the junction point between the mating shunt resistor R and exciting coil 72 (73, 74, 75), the shunt voltage being proportional to the current passing through the exciting coil. The shunt voltages V1 to V4 are produced by a change in the magnetic reluctance developing between the teeth ST0 of the sensor rotor 58 and the teeth ST1 of the sensor stator 56 upon rotation of the sensor rotor 58. More specifically, the change of the magnetic reluctance causes a change in the impedance of the exciting coils 72 to 75, so that the carrier signal Sc is modulated. Therefore, the carrier signal modulated by the modulating wave varying in accordance with the pitch P0 and having a frequency F of about 100 Hz is supplied to the shunt resistor R, and the modulated carrier signal is outputted as the shunt voltages V1 to V4. The shunt voltages V1 and V3 of opposite phases are applied respectively to absolute value circuits 80 and 82 in which they are subjected to full wave rectification. The output of each of the absolute value circuits 80 and 82 has a frequency twice as high as the above modulated wave and therefore is a full wave-rectification waveform having a frequency twice as high as the carrier signal Sc. The outputs of the absolute value circuits 80 and 82 are fed to low pass filters 84 and 86, respectively, in which high frequency components such as the carrier signal SC are removed from these outputs. Therefore, the signal outputted from each of the low pass filters 84 and 86 is composed of the fundamental wave (frequency F) corresponding to the pitch P0 and the DC component. The output signals of the low pass filters 84 and 86 are fed to a subtracter 88 in which the DC components are removed from the output signals by subtraction and the fundamental waves of opposite phases are added together, so that the subtracter 88 outputs a sinusoidal detecting signal Ea having a frequency F. Also, the shunt voltages V2 and V4 of opposite phases are processed in the same manner as described above for the shunt voltages V1 and V3, and the pole position detecting circuit 76 outputs another detecting signal Eb which is 90° out of phase from the detecting signal Ea. In this case, the following formulas (1) and (2) are obtained:

$$Ea = (2\pi x/P0) \quad (1)$$

$$Eb = \sin(2\pi x/P0) \quad (2)$$

wherein x is the amount of movement of the sensor rotor 58 relative to the sensor stator 56. In other words, each time the sensor rotor teeth ST0 moves relative to the stator sensor teeth ST1 by an amount corresponding to one pitch P0, one cycle of each of the detecting signals E and Eb is obtained.

Multipliers 90 and 92 multiply the respective sensing signals Ea and Eb, outputted from the pole position detecting circuit 76, by a speed command signal Iref outputted from a speed control circuit 94 as later described, and the multipliers 90 and 92 output respective current command signals Ia and Ib. If "2πx/P0" is substituted by "θm" in the above formulas (1) and (2), the following formulas (3) and (4) are obtained:

$$Ia = Iref \cdot \cos\theta m \quad (3)$$

$$Ib = Iref \cdot \sin\theta m \quad (4)$$

The current command signal Ia outputted from the multiplier 90 is fed to a subtracter 96 in which a current feedback signal Iaf is subtracted from the command signal Ia, and the output of the subtracter 96 is applied to a current control circuit 98. The value of the current supplied to the motor coil 50 of the pulse motor 10 is detected by a current detecting device 100 to produce a detecting signal which is fed as the above-mentioned current feedback signal Iaf to the subtracter 96. Then, the current control circuit 98 amplifies a difference between the current command signal Ia and the current feedback signal Iaf to produce an amplifier signal, so that the voltage applied to the motor coil 50 of the pulse motor 10 is varied in accordance with the amplifier signal, thereby keeping the drive current, applied to the motor coil 50, to a value corresponding to the current command signal Ia. In other words, the current control circuit 98 supplies to the motor coil 50 the alternating current which has an amplitude corresponding to the current amplitude command signal Iref outputted from the speed control circuit 94 and is in phase with the detecting signal Ea (cos $\theta$m) outputted from the pole position detecting circuit 76.

Similarly, the current command signal Ib outputted from the multiplier 92 is fed to a subtracter 102 in which a current feedback signal Ibf is subtracted from the command signal Ib, and the output of the subtracter 102 is applied to a current control circuit 104. The value of the current supplied to the motor coil 52 of the pulse motor 10 is detected by a current detecting device 106 to produce a detecting signal which is fed as the above-mentioned current feedback signal Ibf to the subtracter 102. Then, the current control circuit 104 amplifies a difference between the current command signal Ib and the current feedback signal Ibf to produce an amplifier signal, so that the voltage applied to the motor coil 52 of the pulse motor 10 is varied in accordance with the amplifier signal, thereby keeping the drive current, applied to the motor coil 52, to a value corresponding to the current command signal Ib. In other words, the current control circuit 104 supplies to the motor coil 52 the alternating current which has an amplitude corresponding to the current amplitude command signal Iref outputted from the speed control circuit 94 and is in phase with the detecting signal Eb (sin $\theta$m) outputted from the pole position detecting circuit 76.

Thus, the drive current corresponding to the current command signal Ia (Iref·cos $\theta$m) is supplied to the motor coil 50, and the drive current corresponding to the current command signal Ib (Iref.sin$\theta$m) is supplied to the motor coil 52. Thus, instead of the two-phase square signal shown in FIG. 6, the two-phase sinusoidal signal operates the pulse motor 10 in a bipolar fashion. In this case, the rotor 12 is rotated quite smoothly, and a torque ripple is kept to a very low level. The rotor 12 is rotated one pitch P0 of the rotor teeth T0 per one cycle of each of the current command signals Ia and Ib. As a result, the rotor teeth T0 of the pulse motor 10 is moved one pitch P0 thereof in synchronization with the movement of the sensor rotor teeth ST1 relative to the sensor stator teeth ST0 by an amount corresponding one pitch P0 of the sensor rotor teeth ST1. The torque developing on the rotor 12 is varied in accordance with the current amplitude command signal Iref, and the greater the current amplitude command signal becomes, the greater torque the rotor 12 produces.

If, out of the magnetic flux $\phi$ produced by the permanent magnet 42, those portions or components linking the motor coils 50 and 52, respectively, are represented by the following formulas (5) and (6), and if "$\theta m=\omega m\cdot t$" is provided, then velocity electromotive forces Va and Vb are represented by the following formulas (7) and (8):

$$\phi a=\phi\cdot\sin\theta m \tag{5}$$

$$\phi b=-\phi\cdot\cos\theta m \tag{6}$$

$$Va=\omega m\cdot\phi\cdot\cos\phi m \tag{7}$$

$$Vb=\omega m\cdot\phi\cdot\sin\phi m \tag{8}$$

wherein t is time.

Therefore, the torque Tm developing in each of the motor coils 31 and 32 is represented by the following formula:

$$Tm=\frac{1}{\omega m}(Va\cdot Ia+Vb\cdot Ib)\alpha\ Iref\cdot\phi \tag{9}$$

Therefore, if the magnetic flux $\phi$ is constant, the torque Tm is proportional to the current amplitude command signal Iref, so that this drum drive system has the advantage that the speed of rotation of the rotor 12 of the pulse motor 10 is controlled only by the current amplitude command signal Iref as is the case with a DC motor.

A method of controlling the speed of rotation of a motor in such a manner is known and disclosed in "Fuji Jiho" (Vol. 53-9) entitled "Transvector control of AC devices". However, the present invention is characterized in that the transvector control of AC devices is applied to a servo control of the pulse motor 10, so that the pulse motor 10, like a DC motor, can be rotated smoothly and be accurately controlled in speed of rotation.

In FIG. 2, numeral 110 denotes a rotational-position detecting circuit which is responsive to the detecting signals Ea and Eb to produce a position pulse signal Pf of a high resolution representative of the position of rotation of the drum 28. More specifically, each time the sensor rotor 58 is angularly moved by an amount corresponding to one pitch P0 of the sensor rotor teeth ST0 to obtain one cycle of each of the detecting signals Ea and Eb, the rotational-position detecting circuit 110 produces the position pulse signal Pf composed of several hundreds of pulses. The position pulse signal Pf corresponds to the position of rotation of the drum 28, and the frequency of the pulse signal Pf corresponds to the speed of rotation of the drum 28.

Figure 10:
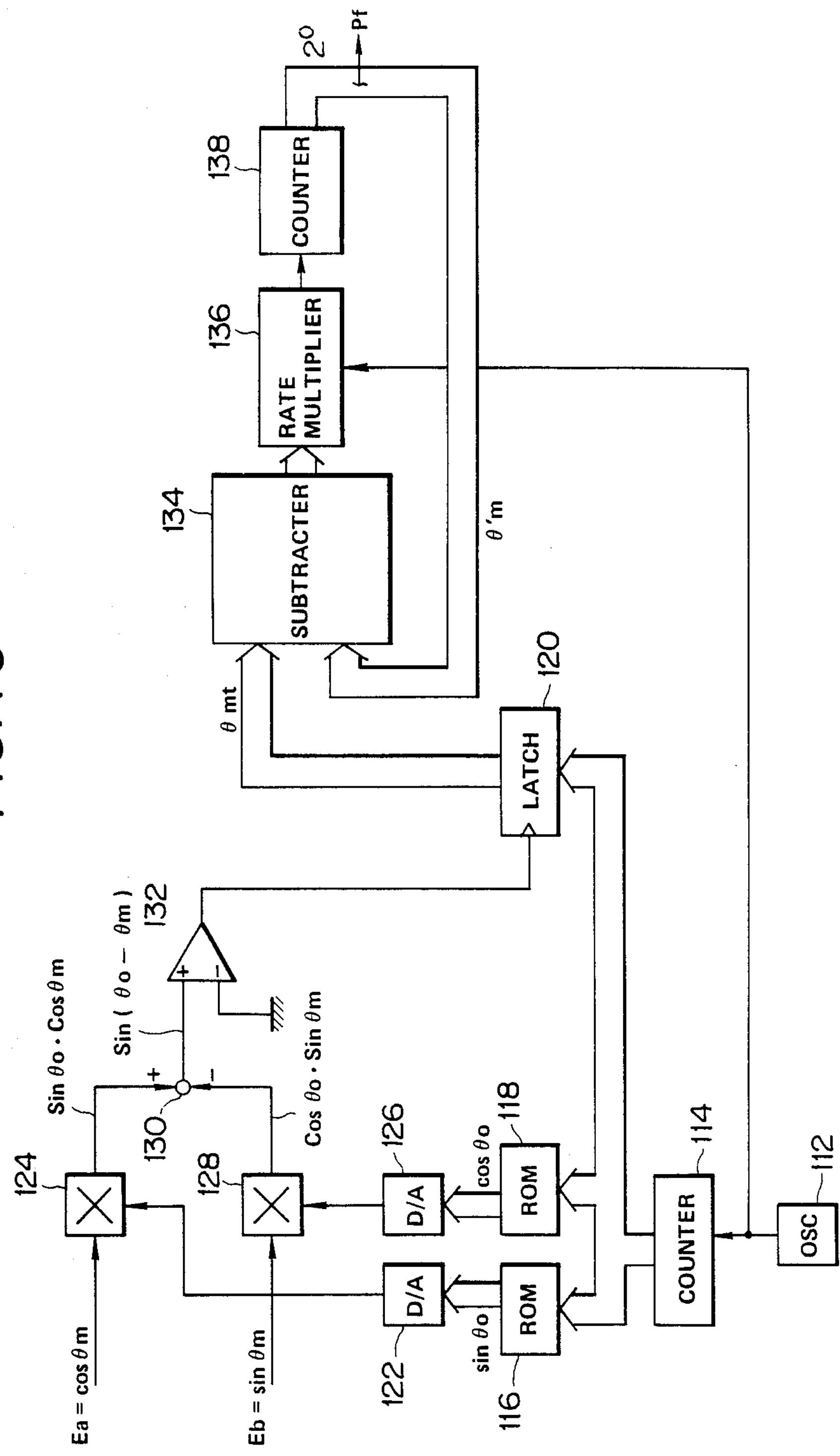
FIG. 10 is a block diagram of a rotational-position detecting circuit.
Figure 11:
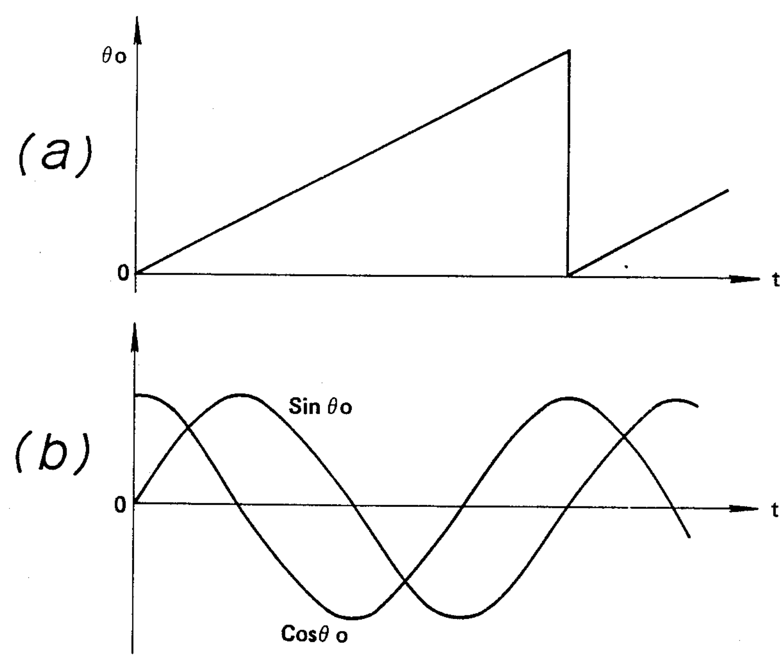
FIGS. 11 to 13 are diagrammatical illustrations showing various waveforms appearing in the rotational-position detecting circuit.

The rotational-position detecting circuit 110 will now be described with reference to FIG. 10. An oscillator 112 produces a clock pulse signal of a predetermined frequency, and reference clock pulses outputted from the oscillator 112 is fed to a counter 114. The counter 114 counts the reference clock pulses and outputs reference phase data $\theta 0$ to function-producing ROMs 116 and 118 and also to a latch 120. The ROM 116 is responsive to the phase data $\theta 0$ to produce sine data sine $\theta 0$ which is converted by a D/A converter 122 into an analog signal and is fed to a multiplier 124. On the other hand, the ROM 118 is responsive to the reference phase data $\theta 0$ to produce cosine data cos $\theta 0$ which is converted by a D/A converter 126 into an analog signal and is fed to a multiplier 128. The relationship of the reference phase data $\theta 0$, the sine data sin $\theta 0$ and the cosine data cos $\theta$O is shown in FIG. 11(*a*) and (*b*). The sine data sin $\theta 0$ and cosine data cos $\theta 0$ converted into the respective analog signals are multiplied through the respective multipliers 124 and 128 by the detecting signals Ea(cos $\theta$m) and Eb(sin $\theta$m), respectively. The outputs of the multipliers 124 and 128 are fed to a subtracter 130 in which the multiplication result (cos $\theta$O·sin $\theta$m) of the multiplier 128 is subtracted from the multiplication the result (sin $\theta$O·cos $\theta$m) of the multiplier 124. Therefore, the result of this subtraction is represented by "sin($\theta$O−$\theta$m)" as is clear from the following formula (10):

$$\sin\theta O\cdot\cos\theta m-\cos\theta O\ \ \sin\theta m=\sin(\theta 0-\theta m) \quad (10)$$

Figure 13:
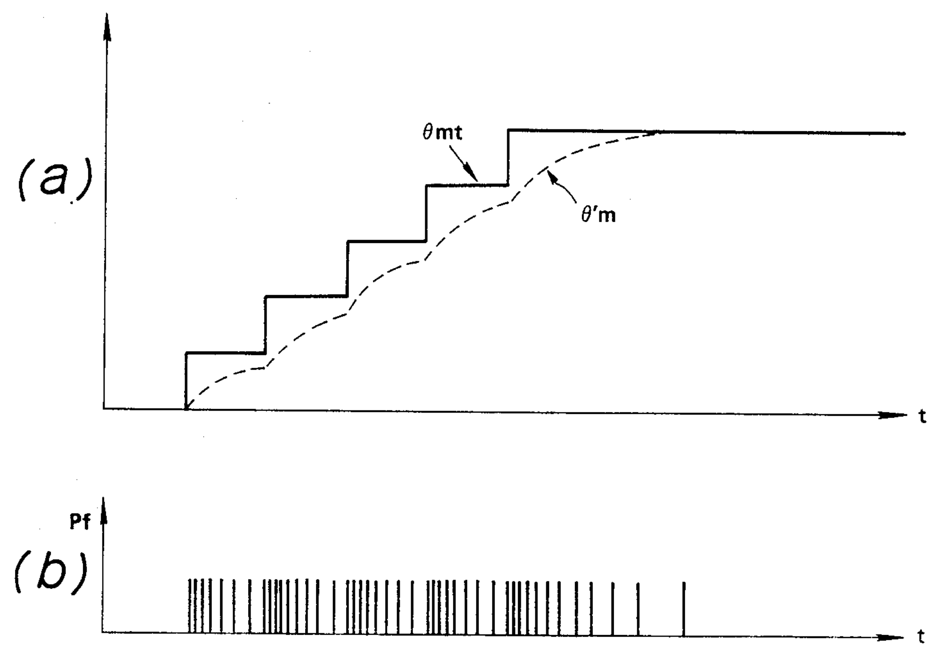
Figure 12:
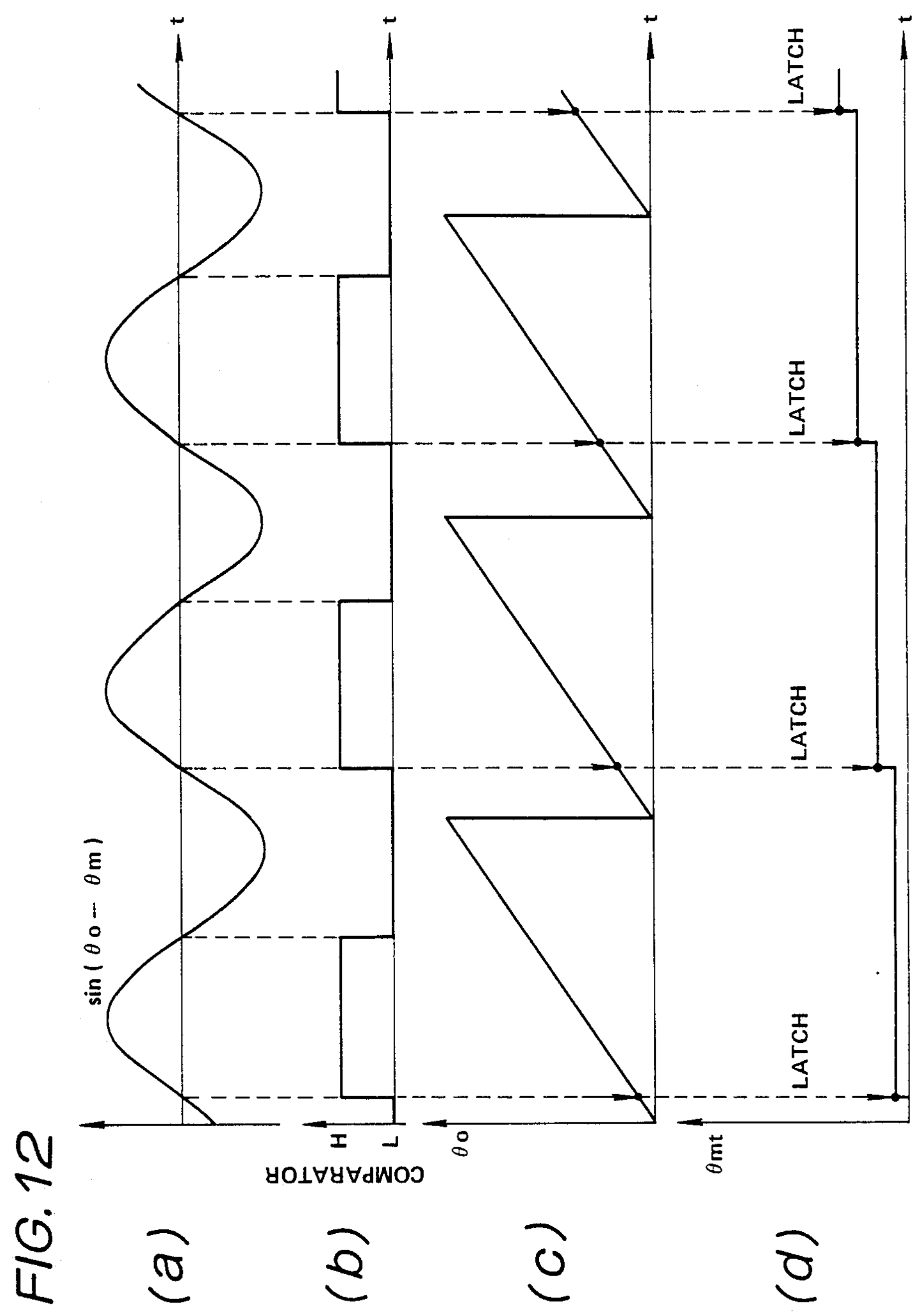

The output of the subtracter 130 representative of 'sin ($\theta$−$\theta$m) is fed to a comparator 132. As shown in FIGS. 12(*a*) and (*b*), the comparator 132 outputs a high-level signal "H" to the latch 120 each time the output of the subtracter 130 representative of sin($\theta$O−$\theta$m) is positive, and also outputs a low-level signal "L" to the latch 120 each time the output of the subtracter 130 is negative. As shown in FIGS. 12(*c*) and (*d*), the latch 120 latches the reference phase data $\theta$0 each time the output of the comparator 132 goes high. The latched data is regarded as data corresponding to "$\theta$m", and is fed from the latch 120 to a digital subtracter 134 as sampling data $\theta$mt. As shown in FIG. 13(*a*), the sampling data $\theta$mt is increased by several bits in a step-by-step manner, and therefore this sampling data is interpolated by a digital first-orders lag filter constituted by the subtracter 134, a rate multiplier 136 and a counter 138. The count $\theta$m' of the counter 138 is supplied in an interpolated form. More specifically, a difference between the sampling data $\theta$mt and the content $\theta$m' of the counter 138 is obtained by the subtracter 134, and difference data representative of this difference is fed from the subtracter 134 to the rate multiplier 136. The rate multiplier 136 thins out the reference pulses fed from the oscillator 112 at a rate determined by the difference data fed from the subtracter 134, and outputs the thinned-out pulse train to the counter 138. In this case, the greater the difference data is, the higher the frequency of the pulse signal fed to the counter 138 becomes. Therefore, as shown in FIG. 13(*a*), the count $\theta$m' of the counter 138 is smoothly increased in accordance with the sampling data $\theta$m. And, the position pulse signal Pf as shown FIG. 13(*b*) is obtained by outputting the LSB ($2^0$) of the count $\theta$m'. Thus, the rotational-position detecting circuit 110 outputs the pulse signal Pf representative of the position of rotation of the drum 28 during the movement of the sensor rotor 58 by an amount corresponding to one pitch P0 of the sensor rotor teeth ST0.

Referring again to FIG. 2, a F/V converter 142 (frequency-to-voltage converter) converts the position pulse signal Pf, outputted from the rotational-position detecting circuit 110, to a voltage signal and outputs this voltage signal to a subtracter 144 as a speed feedback signal Vf corresponding to the speed of rotation of the drum 28. An up-down counter 146 counts up pulses of a position command pulse signal Pref fed from a pulse generator 148 and counts down pulses of the position pulse signal Pf outputted from the rotational-position sensing circuit 110. The count of the up-down counter 146, that is, data representative of a difference between the number of the pulses of the position command pulse signal Pref and the number of the pulses of the position pulse signal Pf, is converted into a analog signal by a D/A converter 150 and is outputted from the D/A converter 150 as a speed reference signal Pe. The speed reference signal Pe outputted from the D/A converter 150 is fed to the subtracter 144 in which the speed feedback signal Vf is subtracted from the speed reference signal Pe, and the output of the subtracter 144 is fed to the speed control circuit 94.

The speed control circuit 94 determines the magnitude of the current amplitude command signal Iref in such a manner that the speed reference signal Pe becomes equal in magnitude to the speed feedback signal Vf. More specifically, when the speed of rotation of the pulse motor 10 (and hence the drum 28) is lowered due, for example, to a variation in load torque, so that the speed reference signal Pe becomes greater in magnitude than the speed feedback signal Vf (Pe>Vf), the speed control circuit 94 increases the magnitude of the current amplitude command signal Iref in order to accelerate the speed of the pulse motor 10. On the other hand, when the speed of rotation of the pulse motor 10 (and hence the drum 28) is increased, so that the speed reference signal Pe becomes smaller in magnitude than the speed feedback signal Vf (Pe<Vf), the speed control circuit 94 decreases the magnitude of the current amplitude command signal Iref in order to decelerate the speed of the pulse motor 10. In such cases, when the speed reference signal Pe becomes equal in magnitude to the speed feedback signal Pe again, the magnitude of the current amplitude command signal Iref is maintained at that value. Therefore, the pulse motor is always rotated at a constant speed. In this case, the speed of rotation of the pulse motor 10 is determined by the frequency of the position command pulse signal Pref, and the higher the frequency of the pulse signal Pref is, the higher the speed of rotation of the pulse motor 10 becomes.

The operation of the drum drive system will now be described with respect to the case where the rotor 12 of the pulse motor 10 is to be rotated at a selected speed. In this case, it is assumed that the rotor 12 is stopped at a predetermined initial stop position.

First, the frequency of the position command pulse signal Pref is set to a value corresponding to the selected speed of rotation of the rotor 12, and the position command pulse signal Pref is fed to the up-down counter 146. At this time, since the drum 28 is stopped, the frequency of the position pulse signal Pf outputted from the rotational-position detecting circuit 110 is zero. Therefore, the counter 146 only counts up the pulses of the position command pulse signal Pref, so that the count of the counter 146 temporarily becomes great. As a result, the speed reference signal Pe is greater in magnitude than the speed feedback signal Vf (Pe>Vf), the speed control circuit 94 increases the magnitude of the current amplitude command signal Iref so a to achieve the acceleration. Then the current control circuit 98 supplies to the motor coil 50 the alternating current which has an amplitude corresponding to the current amplitude command signal Iref outputted from the speed control circuit 94 and is in phase with the detecting signal Ea (cos $\theta$m) outputted from the pole position sensing circuit 76. At the same time, the current control circuit 104 supplies to the motor coil 52 the alternating current which has an amplitude corresponding to the current amplitude command signal Iref outputted from the speed control circuit 94 and is in phase with the sensing signal Eb (sin $\theta$m) outputted from the pole position sensing circuit 76. Therefore, a bipolar operation of the pulse motor 10 is started by the two-phase drive current, and the rotor 12 is rotated quite smoothly. In this case, since the current amplitude command signal Iref is of a relatively high magnitude, the rotor 12 is accelerated, and its rotational speed becomes higher gradually.

Then, as the rotational speed of the rotor 12 becomes higher gradually, the rotational-position sensing circuit 110 outputs the position command pulse signal Pf having a frequency corresponding to the speed of rotation of the rotor 12, and the up-down counter 146 counts down the pulses of the position command pulse signal Pf, so that the count of the counter 146 becomes smaller gradually. Therefore, the difference in magnitude between the speed reference signal Pe and the speed feedback signal Vf becomes smaller gradually, so that the current amplitude command signal Iref gradually becomes smaller gradually. Therefore, although the speed of rotation of the rotor 12 continues to become higher, the acceleration, that is, the rate of increase of the rotational speed, gradually becomes lower.

Then, when the rotational speed of the rotor 12 reaches the selected level, the speed reference signal Pe becomes equal in magnitude to the speed feedback signal Vf (Pe=Vf), and the value of the current amplitude command signal Iref obtained at that time is maintained. Thereafter, the rotor 12 continues to be rotated at the selected speed.

As described above, in the present invention, each of the current control circuits 98 and 104 controls the voltage applied to the motor coil 50 (52) in such a manner that the current command signal Ia (Ib) and the current feedback signal Ifa (Ifb) becomes equal in magnitude to each other, so that the drive current applied to each of the motor coils 50 and 52 is controlled in accordance with the current amplitude command signal Iref fed from the speed control circuit 94. With this system, the pulse motor 10 can be rotated as smoothly as a DC motor and can be accurately controlled.

What is claimed is:

1. A system for driving a drum, the drum being rotatable about an axis thereof, said system comprising:

(a) a stepping motor comprising an annular rotor adapted to be fixedly mounted within the drum coaxially therewith for rotation with the drum and having a series of rotor teeth formed at equal intervals over an entire inner periphery thereof, and a stator disposed within said rotor coaxially therewith and having a plurality of magnetic poles having respective exciting coils and spaced equally circumferentially thereof, each of said magnetic poles having a series of stator teeth disposed at equal intervals in closely spaced opposed relation to said rotor teeth, the pitches of said rotor teeth and stator teeth being determined in such a manner that a magnetic flux linking each of said coils is changed in a sinusoidal fashion as a function of the angle of the rotation of said rotor;

(b) pole position-detecting means for producing a multi-phase sinusoidal pole position-detecting signal representative of the position of said magnetic poles of said stator relative to said rotor;

(c) speed control means for producing a current amplitude command signal representative of a desired torque of rotation of said rotor;

(d) multiplier means for multiplying said pole-position detecting signal by said current amplitude command signal to produce a multiplication signal; and (e) current control means responsive to said multiplication signal to output to said coils a drive current corresponding in amplitude to said current amplitude command signal and corresponding in phase to said pole-position detecting signal, thereby energizing said coils to rotate said rotor together with the drum relative to said stator.

2. The system according to claim 1, in which said pole-position detecting means comprises (i) a position sensor which comprises an annular rotor fixedly mounted within the drum coaxially therewith for rotation with the drum and having a series of teeth formed at equal intervals over an entire inner periphery thereof, and a stator disposed within said rotor coaxially therewith and having a plurality of magnetic poles having respective exiting coils and spaced equally circumferentially thereof, each of said magnetic poles of said position sensor having a series of stator teeth disposed at equal intervals in closely spaced opposed relation to said rotor teeth of said position sensor, the pitches of said rotor teeth and stator teeth of said position sensor being determined in such a manner that a magnetic flux linking each of said coils of said position sensor is changed in a sinusoidal fashion as a function of the angle of the rotation of said rotor of said position therefor; (ii) a signal generator for feeding a carrier signal of a square waveform to said coils of said position sensor; (iii) means for detecting currents flowing through aid coils of said position sensor to produce a multi-phase output signal; (iv) means for rectifying said output signal to produce a multi-phase rectifier signal; and (v) low-pass filter means for filtering said rectifier signal to produce said multi-phase sinusoidal pole position-detecting signal.

3. The system according to claim 1, in which the pitch of said rotor teeth of said pulse motor is different from the pitch of said stator teeth of said pulse motor.

4. The system according to claim 3, in which the pitches of said rotor and stator teeth of said position sensor are arranged in the same manner as the pitches of said rotor and stator teeth of said pulse motor.

5. A stepping motor comprising an annular rotor rotatable about an axis thereof and having a series of rotor teeth formed at equal intervals over an entire inner periphery thereof, and a stator disposed within said rotor coaxially therewith and having a plurality of magnetic poles having respective exciting coils and spaced equally circumferentially thereof, a drive current being adapted to be applied sequentially to said coils to energize them to rotate said rotor relative to said stator in a step-like manner, each of said magnetic poles having a series of stator teeth disposed at equal intervals in closely spaced opposed relation to said rotor teeth, the pitches of said rotor teeth and stator teeth being determined in such a manner that a magnetic flux linking each of said coils is changed in a sinusoidal fashion as a function of the angle of said rotor, and the pitch of said rotor teeth being different from the pitch of said stator teeth.

6. A pole position-detecting means comprising a position sensor which comprises an annular rotor rotatable about an axis thereof and having a series of teeth formed at equal intervals over an entire inner periphery thereof, and a stator disposed within said rotor coaxially therewith and having a plurality of magnetic poles having respective exciting coils and spaced equally circumferentially thereof, each of said magnetic poles having a series of stator teeth disposed at equal intervals in closely spaced opposed relation to said rotor teeth, the pitches of said rotor teeth and stator teeth being determined in such a manner that a magnetic flux linking each of said coils of said position sensor is changed in a sinusoidal fashion as a function of the angle of the rotation of said rotor, and the pitch of said rotor teeth being different from the pitch of said stator teeth.

* * * * *